United States Patent Office 3,536,385
Patented Oct. 27, 1970

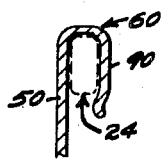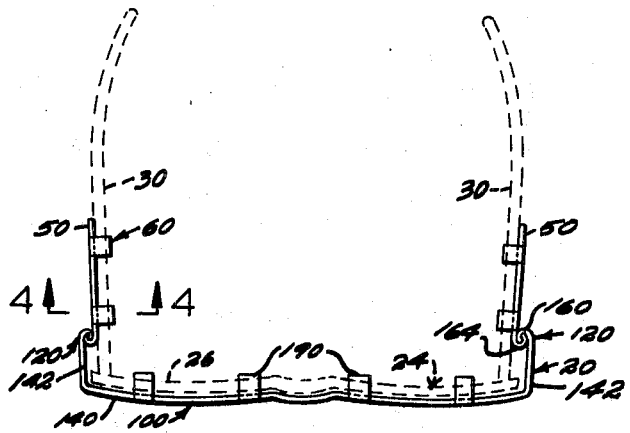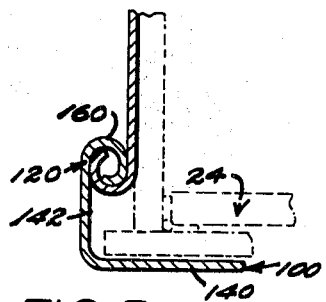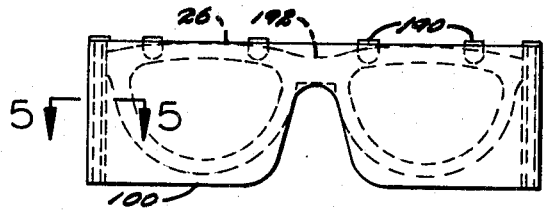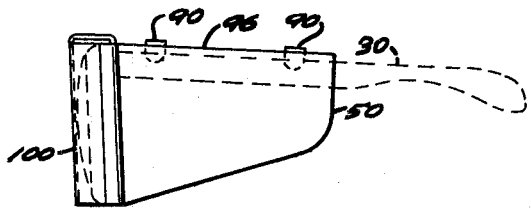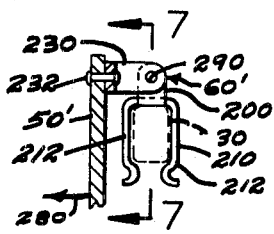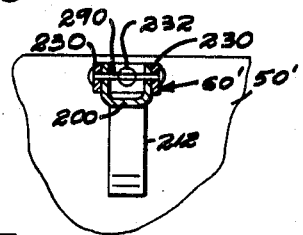

3,536,385
SPECTACLE-MOUNTED EYESHADE
William V. Johnston, 2405 Ridgewood Ave.,
Omaha, Nebr. 68124
Continuation of application Ser. No. 677,939, Oct. 25, 1967. This application Oct. 16, 1969, Ser. No. 867,430
Int. Cl. G02c 9/04
U.S. Cl. 351—47     5 Claims

ABSTRACT OF THE DISCLOSURE

An eyeshade means for attachment to spectacles in which side and front shade portions are pivotally interconnected for folding, as accomplished by integral interlocking sections of said side and front shade portions.

---

This is a continuation of Ser. No. 677,939, filed Oct. 25, 1967, now abandoned.

The side shade portion is removably attached to a forward shade portion.

The background of this invention is the need for means to shade an automobile driver's left eye from light which strikes it from the left-hand side of the automobile. Prior art eyeglasses having side bows which are adapted to shade are not attachable to a common pair of spectacles.

Prior art sunglasses which clip on the forward portions of common spectacles have not had any means for shading the eyes from light entering at the side of the spectacles.

In summary, it is an object of this invention to provide an eyeshade removably attachable to a bow of a pair of common spectacles and for use independently of any eyeshade means that would be disposed on the forward side of the spectacles so that they can be used independently by a driver at desired times.

A further invention provides side shade means which are adapted to swing upwardly out of the way for a full view unimpeded by the shade at desired times and without removal from the bow of the spectacles.

Yet another object is to provide a side shade as described which is removably attached to the forward shade portion for use in combination therewith at times.

In the drawings:

FIG. 1 is a top plan view of the eyeshade of this invention shown as attached to a pair of common spectacles, the latter being shown in dotted lines.

FIG. 2 is a frontal elevation of the parts shown in FIG. 1.

FIG. 3 is a right-hand side elevation of the parts shown in FIG. 1.

FIG. 4 is a sectional view taken along the line 4—4 of FIG. 1.

FIG. 5 is a sectional view taken along the line 5—5 of FIG. 2.

FIG. 6 is a view similar to FIG. 4 but of a modified form of bow attachment means for the side shade.

FIG. 7 is a sectional view taken along the line 7—7 of FIG. 6.

The eyeshade or eyeshade means of this invention is generally indicated at 20 in FIG. 1 and it is for mounting on common spectacles generally indicated at 24 having a lens-carrying portion 26 and having bows 30 attached to and extending from the lens-carrying portion in a conventional manner.

The eyeshade of this invention has a side shade portion 50 disposable in a position extending downwardly from one of the bows, and a pair of side shade portions 50 are preferably used, one for each bow 30.

Attachment means generally indicated at 60 is provided on each side shade 50 for removably attaching it to a respective bow 30 in a manner whereby the side shade is held in a position extending downwardly from the respective bow, as best seen in FIG. 3.

The attachment means 60 can be in the form of a hook 90 as best seen in FIG. 4 and preferably two spaced hooks 90 are provided each preferably being attached to and integral with the upper edge 96 of the side shade 50.

A forward shade portion 100 is placeable across the forward side of the lens-carrying portion 26 and means generally indicated at 120 is provided releasably connecting the side shade portion 50 with the respective end of the forward shade portion 100.

It is preferred that the forward shade portion 100 have a part 140 disposed generally in a vertical plane, the forward shade portion 100 having rearwardly extending portion 142 attached integrally therewith which extend each at approximately a right angle to the forward portion 140 and provided with rearward ends which are in-turned, as best seen at 160, and which interlock with out-turned forward ends 164 of the respective side shade portions 50 for providing a pivotal interconnection which further permits the removal of the side shade portion 50 by pulling them directly upwardly with respect to the forward shade portion 100.

The forward shade portion 100 can have hooks 190 attached to its upper edge integrally and extending rearwardly and downwardly for hooking about the upper edge 192 of the lens-carrying portion 26.

Referring now to FIG. 6, it will be seen that a side shade portion 50' is there shown which is similar in most respects to the side shade portion 50, but with the exception that it does not have the hook 90, but instead has a special attachment means generally indicated at 60' which comprises a first portion 200 having resilient clip means 210 thereon having sides 212 resiliently urged toward each other for gripping a bow 30.

The attachment means 60' further has a second portion 230 fixed to the side shade portion 50' by a rivet 232 and pivotally attached to the first portion 200 in a manner permitting the side shade portion 50' to swing upwardly as indicated by an arrow 280 because of the pivotal attachment at a pivot pin 290.

As thus described, it will be seen that the side shades 50 and 50' can be removed completely from the bows 30 and that the side shade 50' can be removed from interference with the eye by being swung upwardly in the direction of the arrow 280.

As thus described, this invention is believed to fulfill the objectives above set forth in providing a more efficient and effective eyeshade for drivers who wear conventional spectacles.

I claim:
1. An eyeshade means for mounting on spectacles having a lens-carrying portion and having bows attached to and extending from said lens-carrying portion, said shade means having a side shade portion disposable in a position extending downwardly from one of said bows, attachment means on said side shade portion for removably attaching it to said one bow in a manner whereby said side shade is held in the said position, a forward shade portion formed of a single piece of material and extendable across the forward side of a pair of spectacles, means on said forward shade portion for hooking onto the upper edge of the forward portion of a pair of spectacles, means forming a pivotal interconnection between the forward end of said side shade portion and the rearwardly extending adjacent section of said forward shade portion for pivoting movement of said side shade portion with respect to said forward shade portion substantially about a vertical axis, said pivotal interconnection means being partially formed by an integral part of said forward shade portion and par- tially formed by an integral forward section of said side shade portion which latter laps and interlocks with said forward shade portion, and in which said forward shade portion has a rearwardly extending end section at an end thereof, and in which said forward end of said side shade portion is of substantially a hooked shape and the rearward end of said rearwardly extending forward shade end section being of substantially a hook-shape and pivotally interlocked with the forward section of said side shade portion.

2. The combination of claim 1 in which said pivotal interconnection means can be disconnected quickly and without the use of tools so that said side shade portion and said forward shade portion can be used independently of each other.

3. In combination: spectacles having a lens-carrying portion and having bows attached to and extending from said lens-carrying portion, and an eyeshade means, said shade means having a side shade portion disposable in a position extending downwardly from one of said bows, attachment means on said side shade portion for removably attaching it to said one bow in a manner whereby said side shade is held in the said position, a forward shade portion extended across the forward side of said spectacles, means on said forward shade portion hooked onto the upper edge of said forward side of said spectacles, said side shade portion and said forward shade portion together forming two portions of a corner assembly, one of the portions of said corner assembly having a transverse section extending transversely to the remainder of its own portion and lapping the other one of said shade portions of said corner assembly sufficiently close so as to provide the wearer of said combination with a greater assurance of eye comfort than would be possible without said lapping, each lapping part of each corner assembly portion being substantially formed of a same piece of material as the majority of the remainder of its respective portion of said corner assembly.

4. The combination of claim 3 in which said portions of said corner assembly are each formed of a different piece of one-piece material, and in which said portions are pivotally connected where they lap each other by means completely formed of integral parts of each said portion.

5. The combination of claim 4 in which said portions are connected in a manner for quick disconnection by the wearer without the use of tools.

References Cited

UNITED STATES PATENTS

| | | |
|---|---|---|
| D. 208,069 | 6/1967 | Boxer. |
| 2,224,784 | 12/1940 | Goldschmid _____ 2—13 |
| 2,770,167 | 11/1956 | Passet _____ 351—47 |
| 2,858,539 | 11/1958 | Carlson _____ 2—13 |

DAVID SCHONBERG, Primary Examiner

R. L. SHERMAN, Assistant Examiner